United States Patent
Kobayashi et al.

Patent Number: 5,367,514
Date of Patent: Nov. 22, 1994

[54] PHASE CHANGE OPTICAL RECORDING DEVICE AND METHOD EMPLOYING A LASER BEAM WITH DIFFERENTLY ENERGIZED PULSE PORTIONS

[75] Inventors: Hideo Kobayashi; Osamu Ueno; Daisuke Iguchi, all of Kanagawa, Japan

[73] Assignee: Fuji Xerox Co., Ltd., Tokyo, Japan

[21] Appl. No.: 981,339

[22] Filed: Nov. 25, 1992

[30] Foreign Application Priority Data

Nov. 26, 1991 [JP] Japan .................................. 3-336254
Aug. 5, 1992 [JP] Japan .................................. 4-227823
Oct. 26, 1992 [JP] Japan .................................. 4-287465

[51] Int. Cl.$^5$ ............................................. G11B 7/24
[52] U.S. Cl. ..................................... 369/47; 369/100; 369/116; 369/275.2; 430/270; 430/945; 365/113
[58] Field of Search ............... 369/47, 116, 100, 288, 369/48, 59; 430/495, 945, 270, 346; 428/64; 365/113

[56] References Cited

U.S. PATENT DOCUMENTS

| | | | |
|---|---|---|---|
| 4,980,879 | 12/1990 | Yamada et al. | 369/100 |
| 5,038,338 | 8/1991 | Terao et al. | 369/116 |
| 5,107,482 | 4/1992 | Goto et al. | 369/100 |
| 5,206,114 | 4/1993 | Kobayashi | 430/270 |
| 5,215,862 | 6/1993 | Suzuki | 430/270 |

FOREIGN PATENT DOCUMENTS 63-300436 12/1988 Japan .
2-195538 8/1990 Japan .

OTHER PUBLICATIONS

"CPM 87 to 88 (1987)" by Electronic Communication Society, published on Dec. 18, 1987.

Ohta et al., "CPM 89–84" by Electronic Communication Society, published on Dec. 15, 1989.

"SPIE" vol. 1078 Optical Data Storage Topical Meeting (1989), published on Jan., 1989.

Optical Memory Symposium '90, pp. 77–78, published on Jul. 11, 1990.

Scripts for Symposium Lecture in the Second Meeting of Phase Change Recording Society, 1991, pp. 60–68, published Jan. 31, 1991.

Scripts for Symposium Lecture in the Second Meeting of Phase Change Recording Society, 1991, pp. 8–19, published on Jan. 31, 1991.

National Conference of Society of Applied Physics, 1991, 11a-SZP-30, published on Oct. 9, 1991.

Primary Examiner—Paul M. Dzierzynski
Assistant Examiner—Kim-Kwok Chu
Attorney, Agent, or Firm—Finnegan, Henderson, Farabow, Garrett & Dunner

[57] ABSTRACT

Disclosed is an optical recording device of a phase change type including at least an optical recording medium having a recording layer formed of a recording material of a phase change type, and a control unit for controlling a unit laser beam, which is to be radiated for writing information onto the optical recording medium to form a recording mark, in such a manner that, when the unit laser beam is divided into front and rear portions with the middle point of the radiated portion of the recording medium as the boundary, the quantity of energy of the rear portion of the unit laser beam is greater than that of the front portion thereof. Also, in the optical recording device, when a recording mark is formed according to a multi-pulse recording system using a multi-pulse laser beam, the multi-pulse laser beam, at least the first pulse thereof is controlled so as to satisfy a similar condition as described above and after then the controlled multi-pulse laser beam or the controlled first pulse thereof is radiated.

9 Claims, 12 Drawing Sheets

FIG. 12
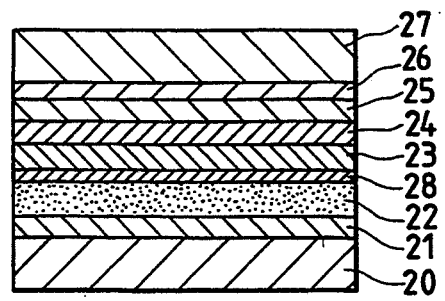
FIG. 13(a) (4T)
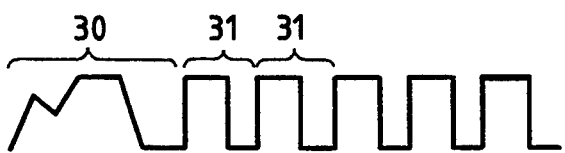
FIG. 13(b) (4T)
FIG. 14
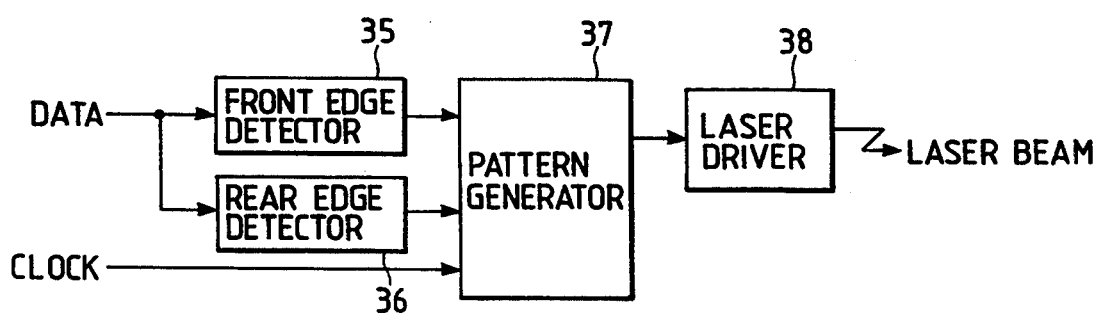

FIG. 19a (1.5T) 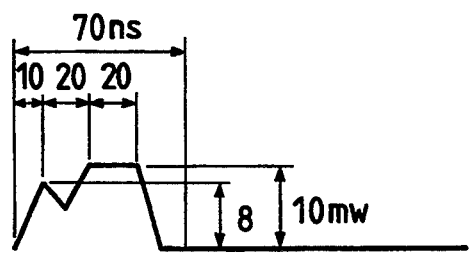
FIG. 19b (2T) 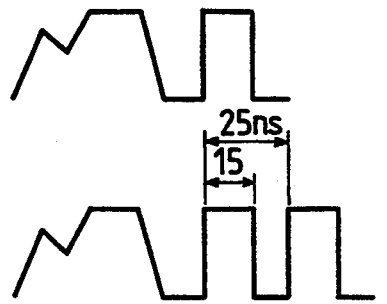
FIG. 19c (2.5T) 
FIG. 19d (3T) 
FIG. 19e (3.5T) 
FIG. 19f (4T) 

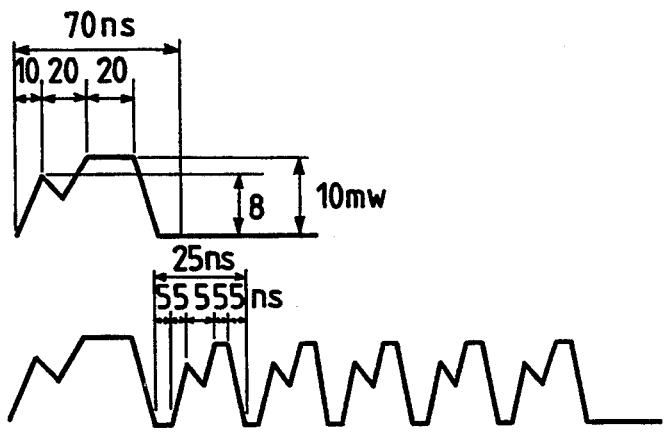
FIG. 20a (1.5T)
FIG. 20b (4T)
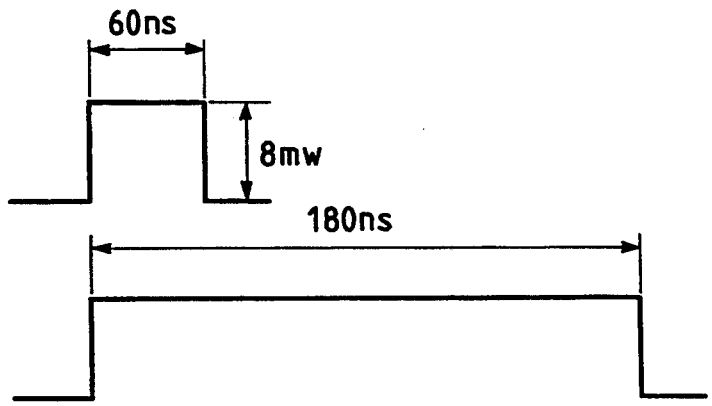
FIG. 21a (1.5T) PRIOR ART
FIG. 21b (4T) PRIOR ART

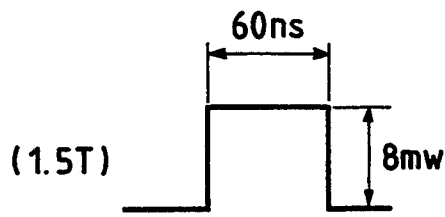
FIG. 22a (1.5T)
PRIOR ART
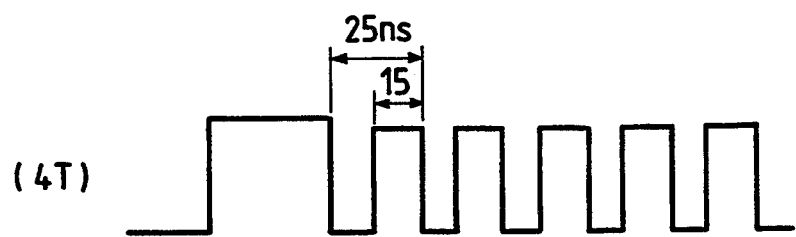
FIG. 22b (4T)
PRIOR ART
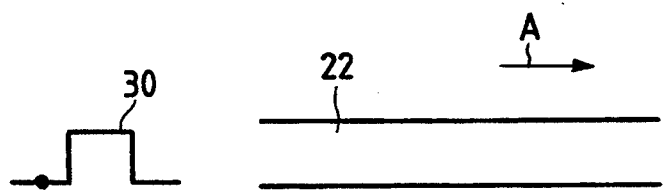
FIG. 23a
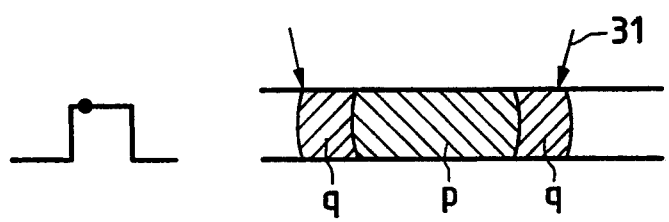
FIG. 23b
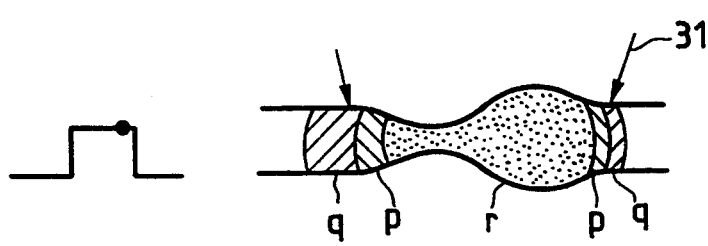
FIG. 23c
FIG. 23d FIG. 24a 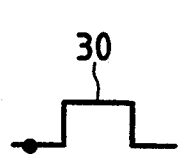 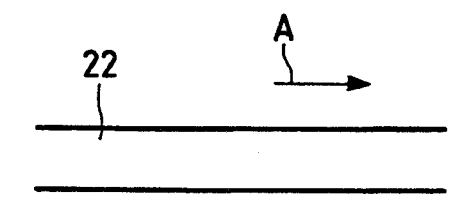
FIG. 24b  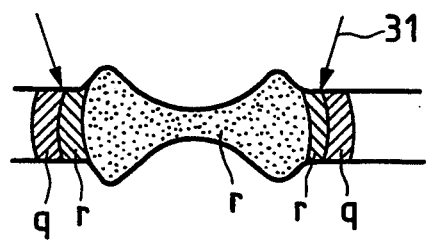
FIG. 24c  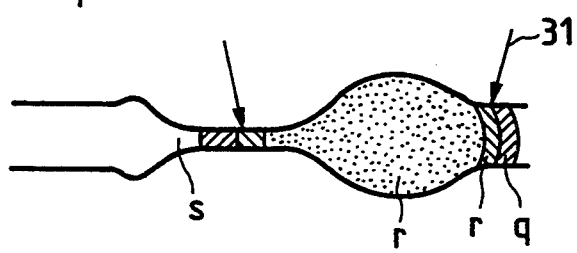
FIG. 24d  

| STATE | INPUT | OUTPUT |
|---|---|---|
| 2 | A | 2 |
| 2 | B | 3 |
| 2 | C | 4 |
| 2 | D | 2 , 2 |
| 2 | E | 6 |
| 2 | F | 4 , 2 |
| 2 | G | 5 |
| 3 | A | 3 |
| 3 | B | 4 |
| 3 | C | 5 |
| 3 | D | 3 , 2 |
| 3 | E | 7 |
| 3 | F | 5 , 2 |
| 3 | G | 6 |

FIG. 29
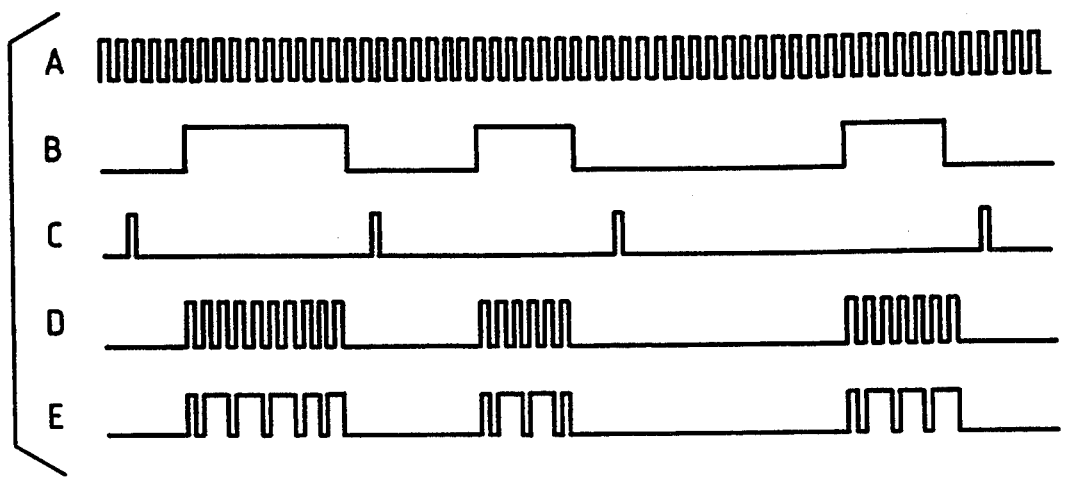
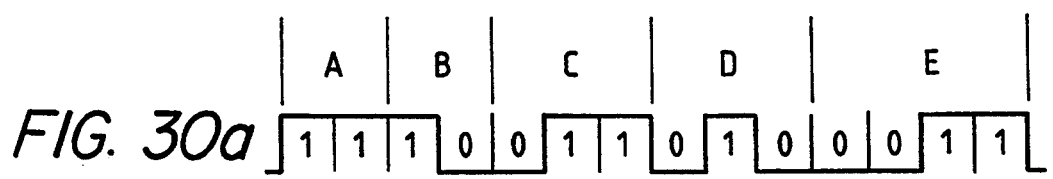
FIG. 30a
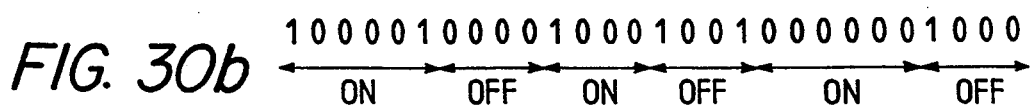
FIG. 30b

PHASE CHANGE OPTICAL RECORDING DEVICE AND METHOD EMPLOYING A LASER BEAM WITH DIFFERENTLY ENERGIZED PULSE PORTIONS

BACKGROUND OF THE INVENTION

The present invention relates to a phase change type of optical recording device which is capable of rewriting information by use of phase change and an optical recording method using the same and, in particular, to a phase change type of optical recording device which radiates a pulse-like laser beam controlled so as to satisfy a given condition when a recording mark is formed to thereby obtain an excellent repetitive recording and erasing characteristic and an optical recording method using the same.

Conventionally, as a recording medium for use in a rewritable optical recording system which radiates a focused light such as a laser beam or energy such as heat on the recording medium to change reversibly the optical properties of the radiated portion of the recording medium to thereby achieve the recording, reproducing or erasing of information, for example, there is known a recording medium which comprises a light transmissive substrate including a pre-groove for tracking or focusing servo, a recording layer disposed on the upper surface of the substrate and formed of a recording material of a phase change type, an inorganic dielectric layer disposed on the opposite side of the recording layer to the substrate, a reflecting layer disposed on the opposite side of the inorganic dielectric layer to the substrate, and another inorganic dielectric layer which can be interposed between the substrate and recording layer as required to protect the recording layer.

Then, as a method for recording or erasing the information on such optical recording medium, there is normally employed a one-beam-over-write recording and erasing method which will be described below:

To write the information into the optical recording medium, a circular laser spot of a high output is driven by a rectangular pulse wave to radiate the recording layer, and the radiated portion of the recording layer is heated to a temperature equal to or higher than the melting temperature (Tm) of the recording material and is then quenched, thereby changing the radiated portion from its crystal state (crystal phase) to its noncrystal state (amorphous phase). On the other hand, to erase the written information, a circular laser spot of a low output is driven by a rectangular pulse wave to radiate the recording layer, and the radiated portion of the recording layer is heated within a range of temperature equal to or higher than the crystallizing temperature (Tx) of the recording material in the radiated portion of the recording layer and equal to or lower than the melting point thereof and is then cooled down gradually, thereby changing the radiated portion of the recording layer from its noncrystal state (amorphous phase) to its crystal state (crystal phase).

As the recording material that can be used to form the recording layer of an optical recording medium utilizing the above-mentioned phase change between the crystal phase and amorphous phase, in particular, there is known a thin film material such as material of Ge—Sb—Te system, material of In—Ge—Te system or the like. For example, it is reported about the material of Ge—Sb—Te system that a time necessary for erasure is 100 ns or less and thus a high speed erasure is possible, and its crystallizing temperature is 150° C. or higher and thus its stability in its amorphous phase is high (see "CPM 87 to 88 (1987)" published by Electronic Communication Society).

However, in the conventional optical recording system of a phase change type which employs the above-mentioned one-beam-over-write recording and erasing method, there is a great problem in its repetitive recording and erasing characteristic. That is, as the number of times of recording, reproducing and erasing is increased, noise is increased, which deteriorates the recording and reproducing characteristic of the system.

As a main factor which has an effect on the repetitive characteristic, there are pointed out the movement of the recording material caused by a heat history and the thermal deterioration of the protective layer and reflecting layer. Here, the movement of the recording material is a phenomenon that the recording material in the portion of the recording layer heated and melted by means of radiation of a laser beam is caused to move gradually along a track in the advancing direction of an optical disc (an optical recording medium) or in the reversed direction thereof when recording and erasing are repeated. Describing the movement phenomenon concretely, as shogun in FIGS. 23 and 24, when a laser spot light 31 driven by a rectangular pulse wave 30 is used to radiate a recording layer 22 (an arrow A in FIGS. 23 and 24 shows the moving direction of the laser spot light), it is believed that there occurs a movement (FIG. 23) caused by the asymmetrical deformation of the recording material and a movement (FIG. 24) caused by the asymmetrical solidification of the recording material (the states of such movements are shown along the radiation processes of the laser spot light sequentially, that is, in FIGS. 23 and 24, there are shown sequentially the respective states thereof in the black dot positions respectively shogun in the rectangular pulse wave 30). It is believed that the movement (FIG. 23) of the recording material caused by the asymmetrical deformation thereof is a phenomenon which occurs as a result of asymmetric thermal expansion induced in the material due to the uneven distribution of heat generated when it is heated. In FIG. 23, reference character p designates the highest heat portion, q a high heat portion and r a melted area. Also, it is believed that the movement (FIG. 24) caused by the asymmetrical solidification is a phenomenon which occurs as a result of the fact that the material of the melted area is pushed out by the earlier solidifying portion due to a time lag between the starting times of the material solidification after the material is heated and melted. In FIG. 24, reference character s designates a solidification start portion.

When the recording layer is caused to vary in the thickness thereof with the above-mentioned movements of the recording material, then in the portion of the recording layer with the thickness thereof reduced, there is increased the area of the interface thereof with respect to the volume of the recording material, which makes it easy for heat to escape. This results in the deteriorated sensitivity of the thickness reduced portion and the mechanical strength of the thickness reduced portion is decreased, which facilitates the generation of defects in such portion. On the contrary, in the thickness increased portion, the energy absorbed therein is difficult to escape and thus quenching becomes impossible, with the result that a recording mark is reduced in size to thereby lower C/N. Further, when the thicknesses of the recording layer are reduced or increased to be out of the design thicknesses of the recording layer, then the reflectance thereof is caused to vary, which results in the deteriorated signals. As a result of this, there are generated the above-mentioned increase of the noise and the deterioration of the recording and reproducing characteristic. In the worst case, no recording material is present in the neighborhood of a data recording starting point and thus recording itself is impossible.

In order to solve these problems, models for thermal analysis and material movement have been proposed. For example, with respect to the thermal analysis, Ohta et al. report their examination in "CPM 89-84" published by Electronic Communication Society. Also, in "SPIE Vol. 1078 Optical Data Stage Topical Meeting (1989)", there is proposed a model for the movement of the recording material due to the deformation of the protective film in the recording and melting time. However, no practical means has been found yet which prevents the above-mentioned movement of the recording material.

As concrete means to control the movement of the recording material to thereby improve the repetitive recording and erasing characteristic of the optical recording device, there has been proposed an optical recording member in which each of heat resistant protective films respectively to be disposed on the top and bottom surfaces of a recording layer formed of a recording material of a phase change type is formed of a material of which the quantities of expansion are symmetrical to each other in the front and rear portions of a mark to be formed in the heat resistant protective film by radiating a laser beam (Japanese Patent Unexamined Publication No. Hei. 2-195,538). However, according to this optical recording member, the repetitive recording and erasing characteristic cannot be improved sufficiently and the material of the heat resistant protective film is limited. Also, in this recording member, in order to improve the symmetry of the thermal expansion quantities in the front and rear portions of the mark in the heat resistant protective layer, as a laser beam used to radiate the recording layer to thereby form the recording mark, there is employed means using a pulse wave which has a power level at the starting time of the pulse radiation higher (for example, 50% or so) than a power level at the completion time of the pulse radiation. However, this laser beam radiation means is found that it is not able to improve the repetitive recording and erasing characteristic sufficiently.

Besides the above proposals, in an Optical Disc Meeting in 1991, Suzuki et al. proposed that a medium structure should be employed in which the highest temperature is present at the center of a melting area when a recording material is melted. In fact, however, it is difficult to provide sufficient improvement effects even if this means is employed.

Also, as an optical recording system of the above-mentioned phase change type, there is known a multi-pulse recording system which is pit edge recording system and which radiates a plurality of rectangular pulses each having a short pulse width so as to record a recording mark. The multi-pulse pit edge recording system is a system which detects the positions of both ends of a recording mark to thereby reproduce recorded information. When compared with the conventional pit position recording system which detects the central position of a recording pit, the multi-pulse pit edge recording system has a recording density 1.5 to 2 times and, for this reason, the pit edge recording system is now under serious study. Among the pit edge recording systems, especially, a multi-pulse recording system becomes the object of the study. While the conventional pit edge recording system radiates a rectangular pulse of a length corresponding to the length of a mark to be formed and then forms the mark, the multi-pulse recording system radiates a plurality of pulses each having a short pulse width to thereby form a recording mark (Japanese Patent Unexamined Publication No. Sho. 63-300436, Optical Memory Symposium '90 pp. 77-78). According to the multi-pulse recording system, a recording medium is not heated higher than necessary in forming a recording mark and thus a thermal load can be reduced. In such multi-pulse recording system as well, with respect to its repetitive recording and erasing characteristic, there exists a similar problem which is caused by the movement of the recording material or the like.

SUMMARY OF THE INVENTION

In view of the above-mentioned circumstances, the present invention aims at eliminating the drawbacks found in the optical recording systems according to the prior art. Accordingly, it is an object of the invention to provide a new optical recording device of a phase change type which can sufficiently improve the repetitive information recording, reproducing and erasing characteristic of an optical recording medium using phase change, and an optical recording method using the same device.

Also, it is another object of the invention to provide an optical recording device of a phase change type which can also sufficiently improve the repetitive information recording, reproducing and erasing characteristic of an optical recording medium for use in multi-pulse recording using phase change.

In achieving the above objects, the invention provides an optical recording device of a phase change type, including an optical recording medium of a phase change type in which a laser beam is radiated onto a recording layer formed of a recording material of a phase change type to thereby change reversibly a phase of the radiated potion of the recording layer so as to record or erase information; and control means for controlling a unit laser beam, which is to be radiated for writing the information into the optical recording medium to form a recording mark, in such a manner that, when the unit laser beam is divided into front and rear portions with a middle point of a radiation time thereof as a boundary, a quantity of energy of the rear portion is greater than that of the front portion.

BRIEF DESCRIPTION OF THE DRAWINGS

FIG. 12 is a longitudinal section view of an example of an optical recording medium employed in the invention;

FIGS. 13(a) and 13(b) are pulse waveform charts of a typical example of a multi-pulse laser beam employed in the invention;

FIG. 14 is a block diagram of another embodiment of the control unit employed in the optical recording device shown in FIG. 10;

FIGS. 19a through 19f chart is a pulse waveform of a multi-pulse laser beam given as a ninth embodiment according to the invention;

FIGS. 20a and 20b chart is a pulse waveform of the shortest and longest pulse patterns of a multi-pulse laser beam given as a tenth embodiment according to the invention;

FIGS. 21a and 21b chart is a pulse waveform of the shortest and longest pulse patterns of a multi-pulse laser beam given as a fourth comparison 4 according to the prior art;

FIGS. 22a and 22b chart is a pulse waveform of the shortest and longest pulse patterns of a multi-pulse laser beam given as a fifth comparison 5 according to the prior art;

FIGS. 23a through 23d provide is an explanatory views of an example of the movement phenomenon of a recording material;

FIGS. 24a through 2d provide is an explanatory views of another example of the movement phenomenon of a recording material;

FIG. 29 is an explanatory view of the operation of a modulation circuit employed in the invention; and FIGS. 30(a,b) is another explanatory view of the operation of the modulation circuit employed in the invention.

DETAILED DESCRIPTION OF THE INVENTION

Figure 1:
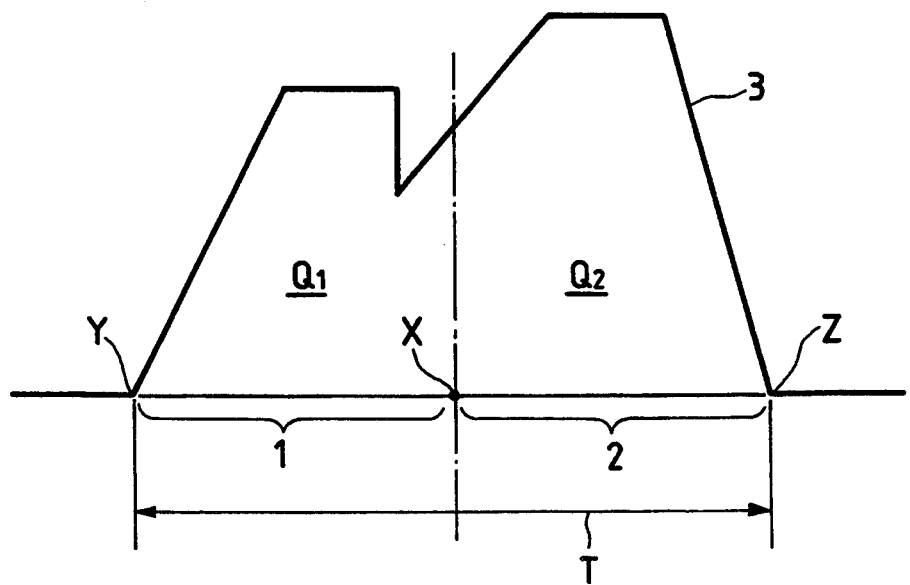
FIG. 1 is an explanatory view of a unit laser beam employed in the invention.

Hereinafter, the invention will be described in detail with reference to the accompanying drawings.

An optical recording device of a phase change type according to the invention includes: an optical recording medium of a phase change type in which a laser beam is radiated onto a recording layer formed of a recording material of a phase change type to thereby change reversibly a phase of the radiated portion of the recording layer so as to record or erase information; and control means for controlling a unit laser beam, which is to be radiated for writing the information into the optical recording medium to form a recording mark, in such a manner that, when the unit laser beam is divided into front and rear portions with a middle point of a radiation time thereof as a boundary, a quantity of energy of the rear portion is greater than that of the front portion.

The optical recording medium to be used in the optical recording device of the phase change type according to the invention basically includes a light transmissive substrate formed of glass, transparent plastic or the like, a recording layer disposed on the substrate and formed of a recording material of a phase change type, an inorganic dielectric layer disposed on the opposite side of the recording layer to the substrate side thereof, and a reflecting layer disposed on the opposite side of the inorganic dielectric layer to the substrate side thereof. As required, the optical recording medium may further include between the substrate and recording layer another inorganic dielectric layer which is used to protect the recording layer. Also, on the reflecting layer, there may be put an ultraviolet hardening resin layer which is used to improve the corrosion resistance of the recording medium and to control the thermal deformation of the recording medium. Further, on the ultraviolet hardening resin layer, there may be disposed through a hot-melt adhesive a protective substrate which is formed of plastic or the like. Preferably, the optical recording medium may have a six-layer structure which includes a substrate, a first inorganic dielectric layer, a recording layer, a second inorganic dielectric layer, a reflecting layer and an ultraviolet hardening resin layer. More preferably, the optical recording medium may have a quenching type structure in which the thickness of the inorganic dielectric layer interposed between the recording layer and reflecting layer is reduced down to several tens nm or so to thereby enable the reflecting layer to act as a cooling layer so as to improve a cooling speed.

Further, as the recording material used to form the recording layer which is disposed on the substrate, there is no special limitation to this and any material may be used, provided it allows recording, reproducing and erasing of information by use of its optical property based on the phase change thereof. For example, there are available the following materials: a two-element material such as Te—Ox (with Ge, Se added), In—Se, In—Sb, In—Te, Sb—Te, Sb—Se, Sn—Te, Bi—Se, Te—N, Ge—Te, Ag—Zn, $As_2S_3$ or the like; a three-element material such as Ge—Sn—Te, In—Se—Te, In—Sb—Se, In—Se—Tl, Ge—Sb—Te, Ge—Te—Tl, Ge—Te—Au, Ge—Te—Cu, Ge—Te—Co, Ge—Te—Ni, Sb—Se—Bi, Sb—Se—Te, Sn—Se—Te or the like; and, a four-element material such as Ge—

Te—Sb—Se, Ge—Te—Sn—Au, Ge—Te—Sb—Cu, Ge—Te—Sn—Sn, In—Se—Tl—Co, In—Ge—Sb—Te or the like. Preferably, there may be used a recording material of a phase change type such as a Ge—Sb—Te system material, an In—Sb—Te system material and an In—Ge—Sb—Te system material. Also, as a material which is used to form the inorganic dielectric layer to be disposed on the substrate side of the recording layer or on the opposite side of the recording layer to the substrate side, there is available a material such as ZnS, $SiO_2$, $Ta_2O_5$, $ZrO_2$, AlN, $In_2O_3$, $SnO_3$, $Al_2O_3$, $Si_3N_4$, SiC, TiC, TiN, BN, $LiO_2$ or the like, or ZnS—$SiO_2$ or the like, or a mixture for the compounds of these materials. Further, as a material used to form the reflecting layer, there is available a material such as an Al—Ti system material, an Al—Cr system material, Al, Au, Ag, and any of the alloys of these materials.

Also, the control means employed in the optical recording device of the phase change type according to the invention is means which is used to control a unit laser beam, which is to be radiated to the above-mentioned optical recording medium for writing of information to thereby form a recording mark, in such a manner that, when the unit laser beam is divided into front and rear portions with the middle point of its radiation time as the boundary, the quantity of energy in the rear portion of the unit laser beam is greater than the quantity of energy in the front portion thereof and after then to radiate the thus controlled unit laser beam. According to the control means, basically, the rising or the front edge of write data is detected by a front edge detector, the detected front edge is input into a pattern generator in which a clock is previously guided, there is formed in the pattern generator a pulse of a waveform obtained by modifying a previously registered waveform or the write data, and the pulse is guided into a laser driver to thereby allow a given laser beam to be radiated from a semiconductor laser or the like.

Also, an optical recording method of a phase change type according to the invention is characterized in that, when a recording mark is rosined, it controls a unit laser beam, which is to be radiated so as to form one recording mark, in such a manner that the unit laser beam satisfies a given condition and thereafter radiates the thus controlled unit laser beam, and, with to this characteristic, the present optical recording method is able to improve the repetitive recording and erasing characteristic thereof.

In other words, the unit laser beam to be radiated according to the present invention, as shown in FIG. 1, is controlled in such a manner that, when it is divided into a front portion 1 and a rear portion 2 with the middle point X of the radiation time T thereof as the boundary, the quantity of energy Q2 in the rear portion 2 is greater than the quantity of energy Q1 in the front portion 1. Here, the quantity of energy is expressed by the integral value (area) of the laser power with respect to the radiation time. In FIG. 1, a thick line 3 shows a pulse waveform of a unit laser beam, Y a radiation start time and Z a radiation end time. The quantity of energy Q2 in the rear portion of the unit laser beam may be nominally on the order of 1.1 to 20, preferably, on the order of 1.2 to 10 times the quantity of energy Q1 in the front portion thereof.

Figure 2:
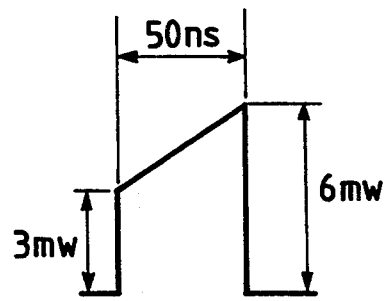
FIG. 2 is a pulse waveform chart of an example of the unit laser beam employed in the invention.
Figure 3:
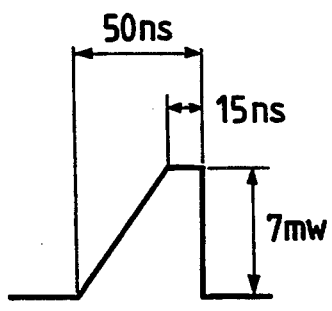
FIG. 3 is a pulse waveform chart of another example of the unit laser beam employed in the invention.
Figure 4:
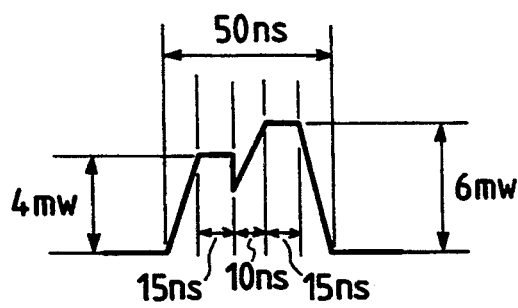
FIG. 4 is a pulse waveform chart of a further example of the unit laser beam employed in the invention.

The unit laser beam controlled so as to satisfy the given condition ($Q_2>Q_1$) mentioned above can be classified into "a single pulse beam" which comprises a single continuous pulse waveform as shown in FIGS. 2 to 4, and "a divisional pulse beam" which is formed by combining together a plurality of pulse beams separated from and independent of each other, as shown in FIGS. 5 to 9.

In the case of the unit laser beam consisting of a single pulse beam, in order to satisfy the condition $Q_2>Q_1$, the inclination or slope of the pulse waveform, the number of peaks, the position of the maximum value of the laser power, or the combinations of these elements are adjusted and controlled. Here, the inclination of the pulse wave is the slope of a waveform line obtained when the laser power is increased or decreased, the number of peaks means whether the pulse waveform has a single peak or a plurality of peaks, and the position of the maximum value of the laser power means not only the position of the peak of the laser power that is obtained when the pulse waveform has a single peak, but also the position of the greatest peak value of the laser power obtained when the pulse waveform has a plurality of peak values (see FIG. 4).

FIGS. 3 and 4 respectively show a single pulse beam in which the slope of the pulse waveform thereof is adjusted in such a manner that a slope obtained when the laser power is increased is gentler than a slope obtained when the laser power is decreased. In FIG. 4, there is shown an example of a single pulse beam in which the position of the greatest value of the laser power thereof is adjusted and the greatest value is positioned in the rear portion of the laser power.

On the other hand, in the case of the unit laser beam consisting of divisional pulse beams, in order to satisfy the condition $Q_2>Q_1$, any of the elements of the unit laser beam, that is, any of the laser power levels, pulse widths and pulse intervals of the respective divisional pulse beams are properly adjusted or controlled. Also, the adjustment may be made by combining together two or more of the elements.

Figure 5:
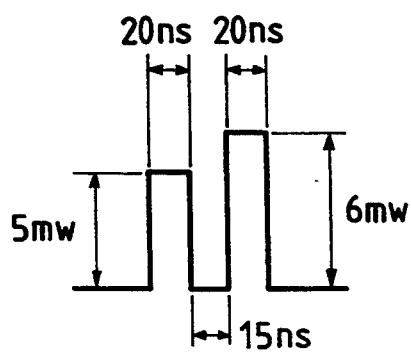
FIG. 5 is a pulse waveform chart of a still further example of the unit laser beam employed in the invention.

FIG. 5 shows an example of a divisional pulse beam in which the laser power levels (the heights of the waveforms) of the respective rectangular pulse beams thereof are controlled. In this embodiment, the power level of a pulse beam is smaller than that of its following pulse beam. In this case, it is assumed in principle that the pulse widths of the respective rectangular pulse waves are all the same.

Figure 6:
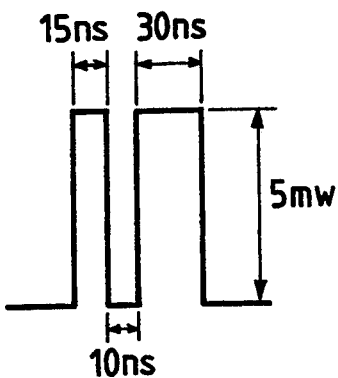
FIG. 6 is a pulse waveform chart of a yet further example of the unit laser beam employed in the invention.

FIG. 6 shows another example of the divisional pulse beam in which the pulse widths (when the respective rectangular pulse beams have the same power level, they correspond to the quantity of energy) of the respective rectangular pulse beams are adjusted such that a pulse width is smaller than its following pulse width. In this case, it is assumed in principle that the power levels of the respective rectangular pulse waves are all the same.

Figure 7:
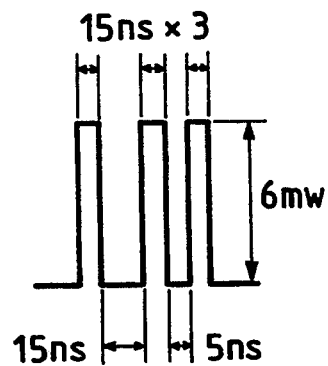
FIG. 7 is a pulse waveform chart of another example of the unit laser beam employed in the invention.

FIG. 7 shows a further example of the divisional pulse beam in which the pulse intervals of the respective rectangular pulse beams are adjusted in such a manner that a pulse interval is greater than its following pulse interval. In this case, three or more pulse beams are necessary and, in principle, it is assumed that the quantities of energy of the respective rectangular pulse waves are all the same.

Figure 8:
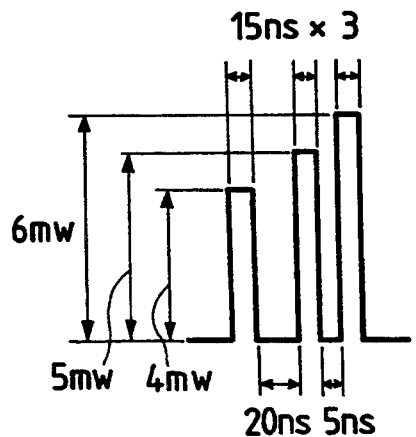
FIG. 8 is a pulse waveform chart of still another example of the unit laser beam employed in the invention.

FIG. 8 shows a still further example of the divisional pulse beam in which the two elements, that is, the laser power level and pulse interval are adjusted in combination such that the laser power is gradually increased while the pulse interval is gradually narrowed.

Figure 9:
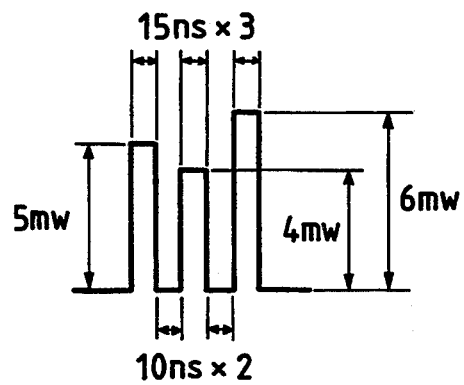
FIG. 9 is a pulse waveform chart of yet another example of the unit laser beam employed in the invention.

Also, in the case of the unit laser beam which consists of divisional pulse beams, as shown in FIG. 9, the respective elements of the pulse beams may be adjusted or controlled such that the condition $Q_2 > Q_1$ can be satisfied collectively. That is, the total quantity of energy of the respective pulse beams in the front portion and the total quantity of energy thereof in the rear portion are controlled such that the condition $Q_2 > Q_1$ can be satisfied.

Figure 10:
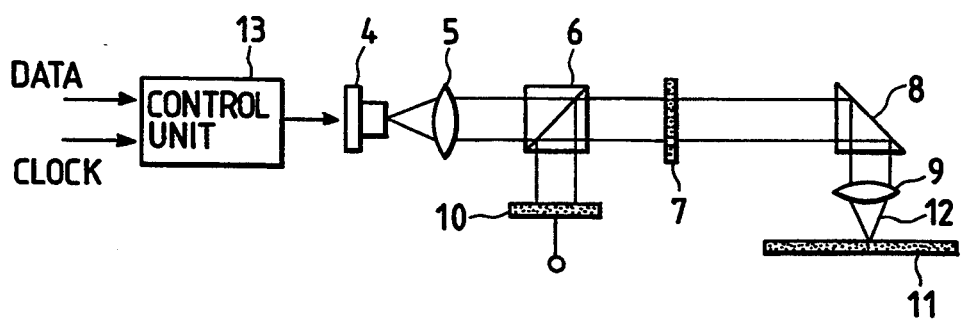
FIG. 10 is an explanatory view of an example of an optical recording device according to the invention.

As a device for radiating a pulse-like laser beam having the above-mentioned structure, any device can be used, provided that it includes an optical system mechanism which is capable of controlling the laser beam so as to satisfy the above-mentioned condition. For example, there can be used such an optical system device for optical recording as shown in FIG. 10. In FIG. 10, reference numeral 4 designates a semiconductor laser, 5 a collimator lens, 6 a polarizing beam splitter, 7 a ¼ wavelength plate, 8 a prism, 9 an objective lens, 10 a detector, 11 an optical disc, and 12 a laser beam. The quantity of energy, that is, the waveform of the unit laser beam of the laser beam 12 is controlled by a control unit 13.

Figure 11:
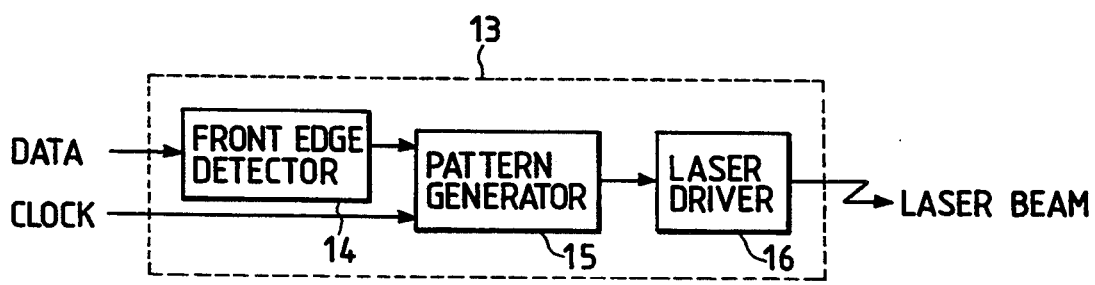
FIG. 11 is a block diagram of a control unit employed in the optical recording device shown in FIG. 10.

Further, the above-mentioned control unit 13, as shown in FIG. 11, basically consists of a front edge detector 14, a pattern generator 15 and a laser driver 16. The control unit 13 is adapted such that it can form a pulse having a waveform previously registered in the pattern generator or a waveform of a given form to be defined by a circuit which transforms write data stored in the pattern generator and then outputs the transformed write data, and then it can guide the thus formed pulse to the laser driver 16 and radiate a unit laser beam of a given waveform from the semiconductor laser 4.

According to the above-mentioned optical recording device, the laser beam that is radiated from the semiconductor laser 4 serving as a laser beam source is condensed onto the optical disc 11 serving as an optical recording medium through a plurality of various optical system elements respectively shown in FIG. 10, thereby being able to achieve the recording, reproducing and erasing of information with respect to the optical disc 11 by means of radiation of the laser beam 12.

Also, as an optical recording medium to which the recording method of the invention is applied, any optical recording medium can be used, provided it includes at least a recording layer formed of a recording material of a phase change type and it has a structure which allows the recording, reproducing and erasing of information by means of a laser beam. FIG. 12 shows a typical example of the structure of the optical recording medium. In this figure, reference numeral 20 designates a substrate, 21 a lower protective film, 22 a recording layer, 23 an upper protective film, 24 a reflecting film, 25 an ultraviolet hardening resin layer, 26 an adhesive layer, 27 a protective substrate, and 28 a composition inclined area.

Further, the control means, which is used in another optical recording device of a phase change type according to the invention, is used to control at least the first pulse of a multi-pulse laser beam, which is used to form one recording mark according to a multi-pulse recording system, in such a manner that, when the pulse is divided into front and rear portions with the middle point of the radiation time thereof as the boundary, the quantity of energy in the rear portion thereof is greater than the quantity of energy in the front portion, and then to radiate the thus controlled multi-pulse laser beam. Basically, according to the control means, the rising position or front edge portion of the write data is detected by a front edge detector, the falling portion or rear edge portion of the write data is detected by a rear edge detector, the detection signals respectively representing the detected front and rear edge portions are guided into a pattern generator to which clocks are supplied, a pulse having a waveform previously stored or a waveform obtained by transforming the write data is formed by the pattern generator, the thus formed pulse is guided into a pulse laser driver, and finally a given multi-pulse laser beam is radiated from, for example, a semiconductor laser.

An optical recording method to be enforced by a recording device which includes the above-mentioned control means, when forming a recording mark, controls a multi-pulse laser beam to be radiated so as to form one recording mark in such a manner that the multi-pulse laser beam can satisfy the above-mentioned given condition and then radiates the thus controlled multi-pulse laser beam, thereby to improve the repetitive recording and erasing characteristic of the recording device. It should be noted here that in the multi-pulse recording, in principle, one recording mark is foraged by radiating a number of pulses corresponding to the length of the recording mark and, only when the recording mark to be formed is the shortest one, one pulse is radiated.

In other words, for the multi-pulse laser beam that is to be radiated according to the invention, as shown in FIG. 13, at least the first pulse 30 of the multi-pulse laser beam, similarly as in the above-mentioned unit laser beam, is controlled in such a manner that, when it is divided into front and rear portions with the middle point of the radiation time thereof as the boundary, the quantity of energy in the rear portion is greater than the quantity of energy in the front portion. For this reason, the multi-pulse laser beam may be controlled in such a manner that, as shown in FIG. 13(a), only the first pulse 30 is controlled as in the above-mentioned manner, or, as shown in FIG. 13(b), not only the first pulse 30 but also all (or some) of the following pulses 31 are controlled in a similar manner. In the multi-pulse laser beam, the quantity of energy in the rear portion thereof may be normally on the order of 1.1 to 20 times, preferably, 1.2 to 10 times the quantity of energy in the front portion thereof.

As a pulse which is controlled such that it can satisfy the above-mentioned given condition in a multi-pulse laser beam, any pulse can be used, provided that it is controlled so as to satisfy the given condition. Basically, the pulse should have a pulse shape (structure) similar to those of the above-mentioned unit laser beams respectively shown in FIGS. 2 to 9. Therefore, control of the pulse, in principle, can be achieved by combining and adjusting the respective elements thereof similar to those as in the above-mentioned unit laser beam.

Also, as a device for radiating a multi-pulse laser beam which has the above-mentioned structure, any device can be used, provided it includes an optical system mechanism which is able to control the above-mentioned given condition. For example, there can be used a device which has a basic structure as shown in FIG. 10 and, especially, as the control unit 13 thereof, there is applied such a control unit as shown below in order to control the laser beam 12 to be radiated.

That is, the control unit 13 of the device, as shown in FIG. 14, basically includes a front edge detector 35, a rear edge detector 36, a pattern generator 37 and a laser driver 38. The control unit 13 is adapted such that it forms a pulse having a waveform which is previously registered in the pattern generator or a waveform of a given shape obtained by a circuit which is used to transform write data input in the pattern generator and output the transformed write data, and that it radiates a given multi-pulse laser beam from a semiconductor laser 4 as shown in FIG. 10.

According to the above device, the recording, reproducing and erasing of the information can be achieved by radiating a controlled multi-pulse laser beam onto an optical disc. Also, as an optical recording medium which is used in the device, any medium can be used, provided that it includes at least a recording layer formed of a recording material of a phase change type and, further, includes a structure which is able to achieve the recording, reproducing and erasing of the information by use of the multi-pulse laser beam. Concretely, for example, an optical recording medium having a structure as shown in FIG. 12 can be used.

According to the present optical recording device as well as the optical recording method using the same device, the repetitive characteristic can be improved. A mechanism which can provide the effects of the improved repetitive characteristic can be assumed as follows:

That is, it is believed that the improved effects of the repetitive characteristic are due to the fact that the movement of the recording material caused by the melting of the recording material when the information is recorded can be controlled sufficiently. According to the conventional recording methods using a rectangular pulse wave laser beam, in most cases, the front and rear end portions of a recording mark to be formed when a recording material is melted and solidified are solidified in an asymmetrical manner. Therefore, for example, when the recording material moves to the rear end portion of the recording mark, even if the movement is initially a slight one, the quantity of the movements of the recording material becomes great after the rewriting of the information has been executed a large number of times. This movement phenomenon is basically caused by the fact that the laser beam to be radiated moves relatively with respect to the recording medium. Further, since the melting area of the recording material moves together with the movement of a laser spot, there is produced a time lag between the solidification of an area (front end portion) which melted first and another area (rear end portion) which melted afterwards, so that the front and rear end portions are apt to solidify asymmetrically to each other.

In view of the above fact, according to the present recording device and method, the laser beam is radiated in such a manner that the melted areas of the front and rear end portions can be solidified and cooled almost simultaneously.

Therefore, according to the invention, a recording mark can be formed by radiating the unit laser beam controlled in the above-mentioned manner such that, basically, the recording mark to be formed is heated gradually from the front end portion thereof to the rear end portion thereof, the melted recording layer areas of the front and rear end portions are allowed to solidify almost simultaneously and are then cooled down, whereby the movement of the recording material can be prevented.

Also, besides this, according to the present recording device and method, it can be expected that the highest temperature that the melted area can reach can be lowered. According to a conventional recording method to be enforced by use of a rectangular pulse, in order to secure a sufficient C/N, the highest temperature is fairly higher than the melting point of the recording material. For this reason, a thermal load given to the portion of the melted area where its temperature reaches the highest temperature, especially, a thermal load given to the protective film is outstandingly great. On the other hand, according to the invention, thermal energy necessary for melting is gradually supplied to the recording material, so that an excellent C/N and repetitive characteristic can be provided without applying the thermal load.

Further, according to the invention, a recording mark can be formed by radiating a multi-pulse laser beam controlled in the above-mentioned manner such that, similarly as in the above-mentioned unit laser beam, the recording mark to be formed is gradually heated from a mark front end potion to be formed by the first pulse to a mark rear end portion to be formed by the following pulses, that is, from the front end portion of the recording mark to be formed to the rear end portion thereof, the melted recording layer areas of the front and rear end portions are allowed to begin solidifying almost simultaneously and are then cooled down, whereby the movement of the recording material can be prevented.

In addition, in the case of the multi-pulse recording method, a plurality of pulses each having a short pulse width are radiated when one recording mark is formed. Due to this, when compared with another bit edge recording method in which a recording mark is formed by radiating a rectangular pulse having a length corresponding to the length of the recording mark, there is reduced the possibility that the recording medium can be heated more than necessary when the recording mark is formed, which reduces a thermal load to be given to the recording medium. This may also serve to control the movement of the recording material.

Now, description will be given below in more detail of the invention with reference to the embodiments of the invention and comparisons.

Embodiments 1 to 8 and Comparisons 1 to 3

An optical system device for optical recording shown in FIG. 10 was used to radiate laser beams respectively of the following types to thereby record information onto an optical recording medium which is formed of the following main components.

Figure 16:
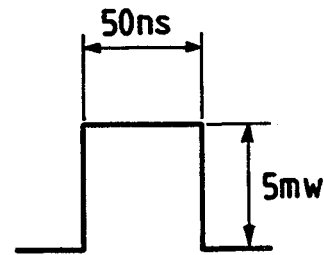
FIG. 16 is a pulse waveform chart of a unit laser beam given as a comparison 2 according to the prior art.
Figure 17:
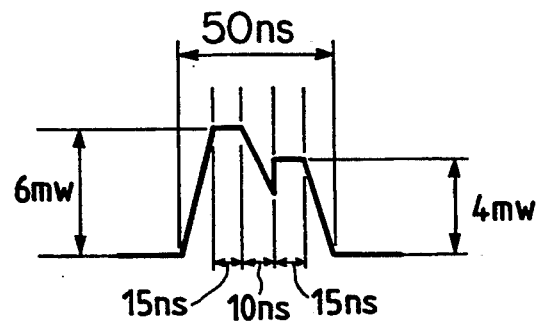
FIG. 17 is a pulse waveform chart of a unit laser beam given as a comparison 3 according to the prior art.

In other words, in the embodiment 1, a laser beam formed of a pulse waveform shown in FIG. 2 is radiated; similarly, in the embodiment 2, a laser beam formed of a pulse waveform shown in FIG. 3 is radiated; in the embodiment 3, a laser beam of a pulse waveform shown in FIG. 4 is a radiated; in the embodiment 4, a laser beam of a pulse waveform shown in FIG. 5 is radiated; in the embodiment 5, a laser beam of a pulse waveform shown in FIG. 6 is radiated; in the embodiment 6, a laser beam of a pulse waveform shown in FIG. 7 is radiated; in the embodiment 7, a laser beam of a pulse waveform shown in FIG. 8 is radiated; and, in the embodiment 8, a laser beam of a pulse waveform shown in FIG. 9 is radiated. On the other hand, in the comparisons as well, laser beams are radiated similarly. In particular, in the comparison 1, a laser beam of a pulse waveform shown in FIG. 15 is radiated; in the comparison 2, a laser beam of a pulse waveform shown in FIG. 16 is radiated; and, in the comparison 3, a laser beam of a pulse waveform shown in FIG. 17 is radiated.

Figure 15:
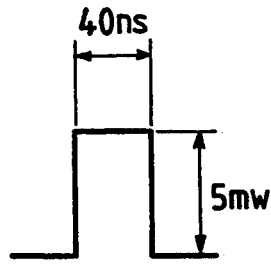
FIG. 15 is a pulse waveform chart of a unit laser beam given as a comparison 1 according to the prior art.

The laser beam shown in FIG. 15 has a rectangular waveform pulse pattern which has been conventionally used, and in this laser beam the quantity of energy is set smaller than that of the embodiment 1 (shown in FIG. 2) to thereby reduce a thermal load to be applied to the recording medium. In the laser beam shown in FIG. 16, the quantity of energy thereof is set larger than that of the embodiment 1 (shown in FIG. 2) to thereby increase the thermal load to be applied to the recording medium. The laser beam shown in FIG. 17 has a pulse waveform pattern which can be obtained by inverting the pulse waveform pattern of the embodiment 3 (shown in FIG. 4) on a time axis and, on the contrary to the condition of the present invention, the laser beam in FIG. 17 is controlled in such a manner that the quantity of energy in the front portion thereof is relatively lager than the quantity of energy in the rear portion thereof.

As the optical recording medium, there was prepared and used an optical recording medium of a structure which is shown in FIG. 12. In other words, to prepare the optical recording medium, there was used a substrate 20 which is formed of a polycarbonate of 1.2 nm; on the substrate 20, there were formed sequentially a lower protective film 21 formed of 80 ZnS-20 $SiO_2$, a recording film 22 formed of $Ge_2Sb_2Te_5$ having a thickness of 20 nm, and an upper protective film 23 formed of SiO having a thickness of 30 nm (however, there was interposed between the recording film 22 and upper protective film 23 a composite inclined area 28 having a thickness of 15 nm the composite of which varies successively in the film thickness direction thereof from the composite of the recording film 22 to the composite of the upper protective film 23); further, on the upper protective film 23, there were formed sequentially a reflecting film 24 of 95 Al-5 Ti system having a thickness of 100 nm and an ultraviolet hardening resin layer 25 having a thickness of 5 to 10 $\mu$m; after then, on the ultraviolet hardening resin layer 25, there was provided through a hot-melt adhesive 26 a protective substrate 27 which is formed of a plastic having a thickness of 1.2 nm.

Figure 18:
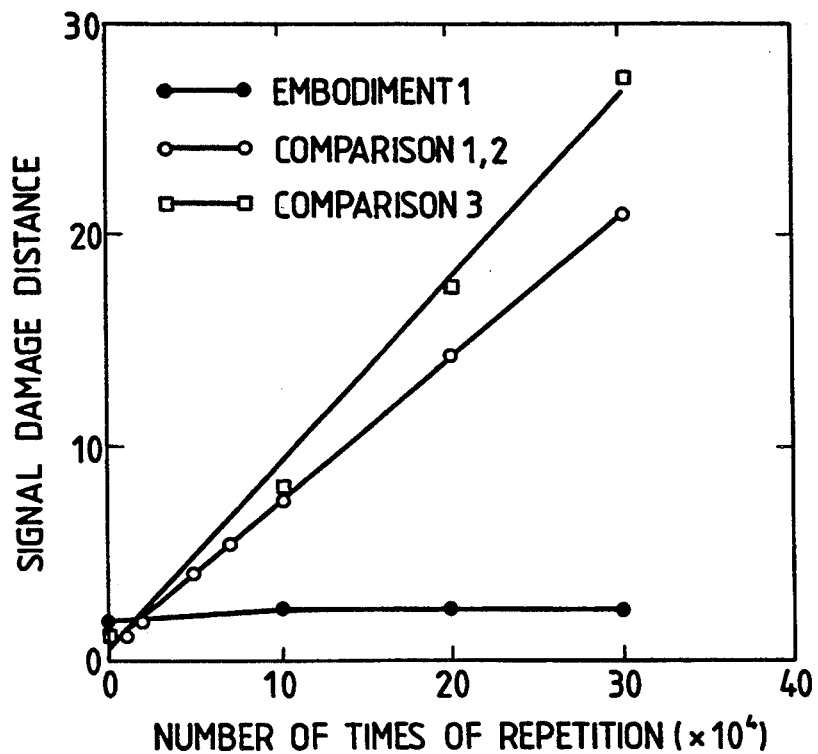
FIG. 18 is a graphical representation of the number of repetition—the length of signal damage, showing the measured results of the repetitive characteristic of the embodiment 1 and comparisons 1 to 3.

According to the recording method described before, the information recording, reproducing an erasing operations were performed repeatedly and a signal damage distance was measured. The results of the embodiment 1 and comparisons 1 to 3 are shown in FIG. 18. A base line was made to correspond to an erasure level and tests were made under the uniform condition of 10 mw. The wavelength of the laser beam was 780 nm and the cycle of the recording pulse was 130 ns. The number of rotation of the recording medium was set for 1800 rpm. It was confirmed that C/N at the beginning of writing were 50 dB or more in each of pulse patterns measured in the present tests.

Here, the signal damage distance means a length where a recording starting point is shifted from its decided position due to the movement of the recording material to thereby interfere with the recording of the information. The measurement of the signal damage distance was obtained in such a manner that a reproduced waveform was recorded by means of an oscilloscope, the damaged time of the reproduced waveform appearing on the recording was measured, and after then the measured time was divided by a time of 1 byte to thereby convert it to a byte length.

From the results shown in FIG. 18, it can be understood that the optical recording method of the invention makes it hard for the damaged signal to occur and can satisfy the repetitive characteristic of 200,000 times or more that is regarded as a product guarantee level. Also, in any of the remaining embodiments according to the invention as well, as the results of the respective tests, there could be obtained a good repetitive characteristic which exceeds 200,000 times.

Embodiments 9 and 10 and Comparisons 4 and 5

The optical system device for optical recording shown in FIG. 10 and the control unit shown in FIG. 14 as the control unit of the optical system device were used to radiate laser beams respectively having pulse waveforms of the following types, and information was recorded into an optical recording medium, which has a structure similar to that of the embodiment 1 except that the composite inclined area is not provided, according to a bit edge recording system using a 2–7 coding method.

In other words, in the embodiment 9, a laser beam was radiated which has a pulse waveform shown in FIG. 19 and, similarly in the embodiment 10, a laser beam shown in FIG. 20 was radiated. In detail, in radiating a multi-pulse laser beam having a pulse pattern used to form marks from the shortest mark (1.5 T) to the longest mark (4 T), at first, the first pulse thereof was radiated and, after then, every 0.5 T the second pulse and its following rectangular pulses or controlled pulses were radiated successively one by one. In the comparisons as well, radiation was executed similarly. In particular, in the comparison 4, a laser beam shown in FIG. 21 was radiated and, in the comparison 5, a laser beam shown in FIG. 22 was radiated.

In addition, the laser beam shown in FIG. 21 is a laser beam which is formed of a rectangular wave [of the shortest (1.5 T) and the longest (4 T) patterns] according to a conventional pit edge recording system other than a multi-pulse recording system, and also which is able to form a recording mark having the same mark length as in the embodiment 9. The laser beam shown in FIG. 22 is a multi-pulse laser beam which is formed of a rectangular wave [of the shortest (1.5 T) and the longest (4 T) patterns] generally used according to the prior art, and also which is able to form a recording mark having the same mark length as in the embodiment 9.

In accordance with the above-mentioned recording method, the information recording, reproducing and erasing operations were executed $10^5$ times repeatedly, and the signal damage distances were measured. The results of the test are shown in Table 1. The test was conduced under the conditions that the wave length of the laser beam is 830 nm, bias power is 10 mw, reproduction power is 1 mw and line speed is 10 m/sec. It was confirmed that C/N in the beginning of writing was 50 dB or more in any of the pulse patterns. Also, the signal damage distance was obtained by performing measurement and conversion similar to those in the embodiment 1.

From the results shown in Table 1, it can be confirmed sufficiently that, when compared with the conventional recording methods as in the comparisons 4 and 5, the recording method of the invention is able to mark it hard for the damaged signal to occur and thus the present invention is more effective.

TABLE 1

|  | Signal Damage Distance |
|---|---|
| Embodiment 1 | 5 Byte or less |
| Embodiment 2 | 3 Byte or less |
| Comparison 1 | 20 Byte or more |
| Comparison 2 | 10 Byte or more |

According to an optical recording device of a phase change type and an optical recording method using the same device in accordance with the invention, a unit laser beam or a multi-pulse laser beam is radiated after it is controlled in such a manner that the above-mentioned given condition ($Q_2 > Q_1$) can be satisfied, so that there can be provided an excellent repetitive recording and erasing characteristic. In addition, due to the fact that the repetitive characteristic is improved in this manner, the present invention can realize both recording of information and rewriting of the recorded information for a long period of time and with higher reliability.

Next, a multi-pulse modulation system in an optical recording device of a phase change type according to the invention will be described hereinafter.

In the multi-pulse modulation system, a pulse-like laser beam emitted from a laser beam source is radiated onto a recording layer formed of an optical recording material of a phase change type. This system is characterized by mark length judgement means for judging a length of a recording mark, pattern memory means for storing a multi-pulse string pattern, read-out means for selecting a multi-pulse string in accordance with the mark length judged and reading out the multi-pulse string in parallel from the pattern memory means, and output means for outputting in series the parallely read-out multi-pulse string in synchronization with a clock signal.

The summary of this system will be described below by way of an example using the RLL (2, 7) code (the smallest run length 2 and the greatest run length 7) as a PWM modulated signal, with reference to FIGS. 26, 27 and 28.

To execute the multi-pulse recording, it is necessary to judge the length of the recording mark, that is, the run length of the recording signal. FIG. 26 is a view in which a process for encoding the RLL (2, 7) code is expressed by means of a tree structure and, in this figure, numerals respectively enclosed with a circle designate binary inputs (NRZ signals) to an RLL (2, 7) modulator and, at the respective nodes A, B, C, D, E, F and G, RLL (2, 7) strings are determined.

Figure 26:
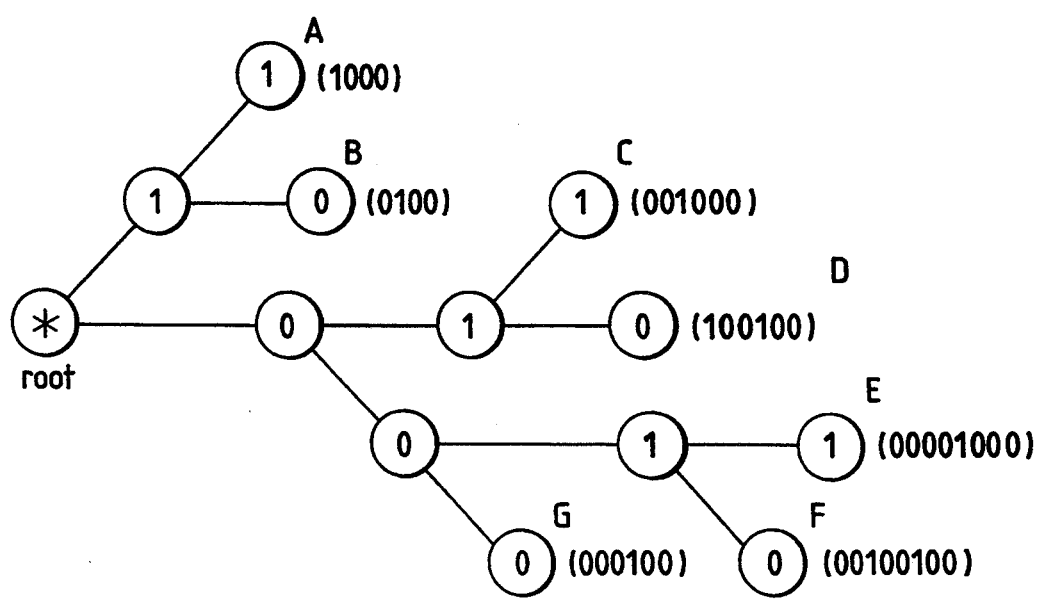
FIG. 26 is an explanatory view of an RLL (2, 7) code, showing how it is coded.

In FIG. 26, when a first bit from root, which shows the start, is "1", then the node A or B is selected according to whether its following bit or second bit is "1" or "0"; when the first bit is "0" and the second bit is "1", then C or D is selected according to whether a third bit is "1" or "0"; when the first and second bits are both "0" and the third bit is "1", then E or F is selected according to whether the fourth bit is "1" or "0"; and, when the first, second and third bits are all "0", then G is selected. Therefore, the original binary codes respectively correspond to the RLL (2, 7) codes in the following manner:

| Binary Codes | RLL (2, 7) Codes | |
|---|---|---|
| (11) | (1000) | (Node A) |
| (10) | (0100) | (Node B) |
| (011) | (001000) | (Node C) |
| (010) | (100100) | (Node D) |
| (0011) | (00001000) | (Node E) |
| (0010) | (00100100) | (Node F) |
| (000) | (000100) | (Node G) |

For example, as shown in FIG. 30, if it is assumed that a recording signal is a node ABCDE as shown in FIG. 2, then its binary code provides 11100110100011 and thus an RLL (2, 7) code corresponding to the binary code provides 100001000100100000001000. The run length (that is, the number of succeeding 0s) of the RLL (2, 7) code corresponds to the mark length of the recording signal and the edge of the RLL (2, 7) code can be recognized from "1". Therefore, by reading the edge of the RLL (2, 7) code, the RLL (2, 7) code can be decoded to the binary code.

Figures 27, 28:
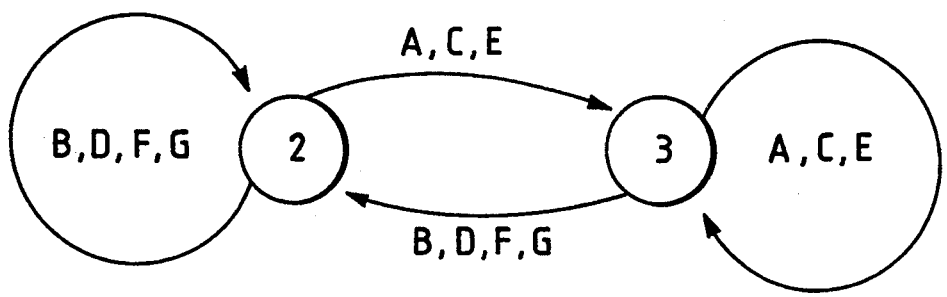
FIG. 27 is a view of transition of the states of a run length judgement circuit.
FIG. 28 is an explanatory view of a relationship between the input and output of the run length judgement circuit;.

The run length of the recording signal may be output in accordance with a state transition shown in FIG. 27. That is, the judgement of the run length is made in accordance with the run (that is, the number of 0s succeeding to the bit "1") being uncertain until the next input as a state variable (that is, a numeral enclosed by a circle) with respect to the detection of one of the nodes A to G. For example, with respect to an input A, from 1000, the judgement is made in a system which takes a value of 3, and with respect to an input B, from 0100, the judgement is made in a system which takes a value of 2. Now, referring to the state transition shown in FIG. 27, in a state 2, when the inputs are B, D, F and G, then the uncertain runs thereof are respectively 2 and, therefore, the state remains still 2. In the state 2, when the inputs are A, C and E, then the uncertain runs thereof are 3 respectively and, therefore, the state 2 is changed to a state 3. In the state 3, when the inputs are A, C and E, then the uncertain runs thereof are 3 respectively and, therefore, the state remains still 3. In the state 3, when the inputs are B, D, F and G, the uncertain runs thereof are 2 respectively and, therefore, the state 3 is changed to the state 2.

The output, as shown in FIG. 28, is the run length that is determined by the input. For example, in the state 2, when the input is A, the code of A has a first bit of 1 and, therefore, an uncertain 2 is made certain so that the output becomes 2. In the state 2, if D is input, then since the code of D is (100100), an uncertain 2 is made certain and, since the fourth bit of the D code is 1 and there are two 0s before the fourth bit 1, 2 is output. Also, in the state 3, if F is input, then since the code of F is 001001100, an uncertain number, that is, 3+2=5 is output and 2 is further output. In the above-mentioned case, description has been given of the RLL (2, 7) code. However, a similar structure can be obtained even if other codes such as an RLL (1, 7) code, an EFM code and the like are used.

As mentioned above, due to the fact that the run length, namely, the recording mark length can be previously judged in the above-mentioned manner, if the patterns of the multi-pulse strings are previously stored in a manner to correspond to the recording mark lengths and the multi-pulse is read out from a memory with the detection signal of the run length as the address, then a multi-pulse string of high speed can be generated and the thus generated multi-pulse string can be made to adapt itself to a high speed pulse modulation method, so that the movement of the recording material can be reduced to thereby realize phase change recording which provides a large number of times of rewriting.

Next, description will be given below of a concrete example of the multi-pulse modulation system according to the invention by way of a case using an RLL (2, 7) code as a PWF modulation code with reference to FIGS. 25 to 30.

Figure 25:
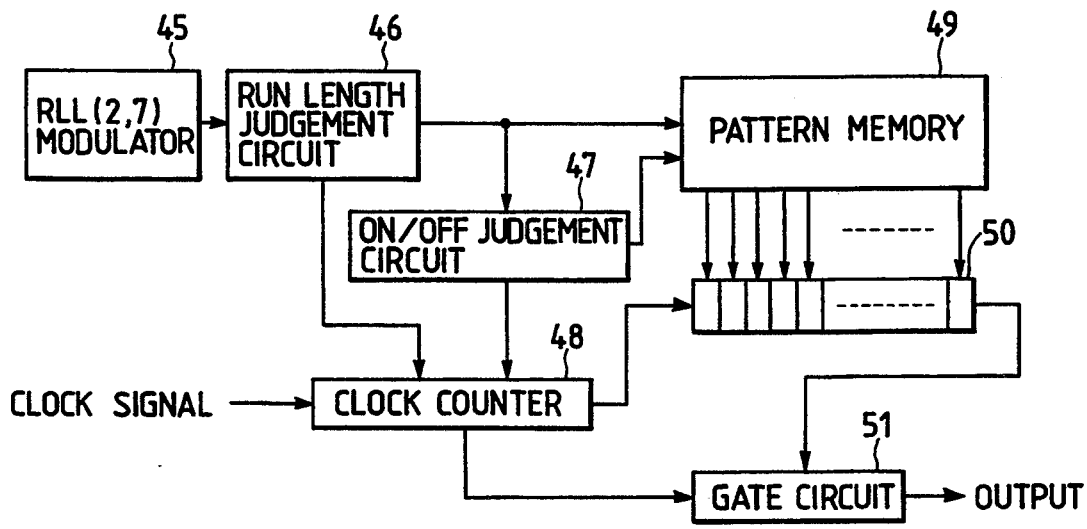
FIG. 25 is a block diagram of a concrete example of the multi-pulse modulation system according to the invention.

In FIG. 25, there is shown a block diagram of the concrete example of the multi-pulse modulation system. An RLL (2, 7) modulator 45 is used to detect nodes A to G respectively in accordance with an encoding process for an RLL (2, 7) code shown in FIG. 26. A run length judgement circuit 46 is used to output run lengths shown in FIG. 28 in accordance with the above-mentioned principle, using the detected nodes A to G as the input thereof. An ON/OFF judgement circuit 47 is used to judge 1/0 of a PWM signal in accordance with the output of the run length judgement circuit 46. This is because 1/0 of the PWM signal, as shown in FIG. 30, is determined as the inverted state of the state occurring just before it.

A pattern memory 49, when the ON/OFF judgement circuit 47 decides the next output as 1, loads in parallel into a shift register 50 a multi-pulse string which can be determined by the output of the run length judgement circuit 46. In other words, as shown in FIG. 29, in accordance with a load signal C, the multi-pulse string E is loaded in synchronization with a clock D corresponding to the run length B. In FIG. 29, there are shown signal waveforms respectively, in which reference signal A stands for a clock signal, B a PWM signal, C a load signal of the shift register 50, D a clock signal to be supplied from a clock counter 48 to the shift register 50, and E a pattern to be output from the pattern memory 49.

Since the above operation is performed while a gate circuit 51 is outputting a PWM signal 0, there is prevented an overhead phenomenon due to the loading operation. The clock counter 48, in accordance with the outputs of the run length judgement circuit 46 and ON/OFF judgement circuit 47, counts a clock signal corresponding to a run length, supplies the clock signal to the shift register 50 while the PWM signal is taking a value of 1, and closes the gate circuit 51 while the PWM signal is taking a value of 0. The gate circuit 51 outputs a zero signal while the gate thereof is being closed by the clock counter 48, and outputs the multi-pulse of the shift register 50 while the gate thereof is being opened.

It should be noted that the present invention is also be able to realize a high speed operation even if it is applied to a conventional recording method using a single pattern of multi-pulse.

As has been described heretofore, according to the invention, a pit edge recording method can be applied in an optical recording system of a phase change type, a recording mark length can be previously judged to thereby generate a multi-pulse string of a high speed, and can be adapted to a high speed pulse modulation method. Thanks to this, according to the invention, the movement of a recording material can be reduced to thereby realize a phase change recording which provides a large number of times of rewriting and thus it is possible to provide a recording method and a recording device having a high reliability.

What is claimed is:

1. An optical recording device of a phase change type, comprising:

an optical recording medium of a phase change type in which a laser beam is radiated during a radiation time period onto a recording layer formed of a recording material of a phase change type to thereby change reversibly a phase of the radiated portion of the recording layer so as to record or erase information; and control means for controlling a unit laser beam, which is to be radiated for writing the information into said optical recording medium to form a recording mark, in such a manner that, when said unit laser beam is time divided into front and rear pulse energy portions with a middle point of the radiation time period thereof providing a boundary between the front and rear energy portions, a quantity of energy of said rear pulse energy portion is greater than another quantity of energy of said front pulse energy portion.

2. The optical recording device as recited in claim 1, wherein said unit laser beam is a single unit pulse beam which is formed of a continuous pulse waveform, and said control means, when controlling said unit laser beam, controls an inclination or slope of said pulse waveform, the number of peaks thereof and a position of the greatest value of a laser power thereof as elements of said unit laser beam.

3. The optical recording device as recited in claim 1, wherein said unit laser beam is formed of a combination of a plurality of divisional pulse beams which are separated from and independent of each other, and said control means, when controlling said unit laser pulse beam, controls one or two or more elements of said unit laser beam, said elements including laser power levels, pulse widths and pulse intervals of said respective divisional pulse beams.

4. The optical recording device as recited in claim 1, wherein said recording medium is a recording medium which allows recording and erasing two or more times.

5. An optical recording method of a phase change type for radiating a laser beam onto a recording layer formed of a recording material of a phase change type to thereby change reversibly a phase of the radiated portion of said recording layer so as to record and erase information, wherein a unit laser beam to be radiated during a radiation time period for forming a recording mark is controlled in such a manner, when said unit laser beam is time divided into front and rear pulse energy portions with a middle point of the radiation time period thereof providing a boundary between the front and rear energy portions, a quantity of energy of said rear pulse energy portion is greater than another quantity of energy of said front portion.

6. The optical recording method as recited in claim 5, wherein said unit laser beam is a single pulse beam formed of a continuous waveform, and an inclination or slope of said pulse waveform, the number of peaks thereof, and a position of the greatest value of a laser power thereof are controlled as elements of said unit laser beam.

7. The optical recording method as recited in claim 5, wherein said unit laser beam is formed of a combination of a plurality of divisional pulse beams which are separated from and independent of each other, and one or two or more elements of said respective divisional pulse beams are controlled, said elements including laser power levels, pulse widths and pulse intervals of said divisional pulse beams.

8. An optical recording device of a phase change type, comprising:

an optical recording medium of a phase change type in which a laser beam is radiated onto a recording layer formed of a recording material of a phase change type to thereby change reversibly a phase of the radiated portion of the recording layer so as to record and erase information; and control means for controlling a multi-pulse laser beam, which is to be radiated during a radiation time period for writing information onto said optical recording medium to form a recording mark, in such a manner that, when sequential pulses of said multi-pulse laser beam within the recitation time period are time divided into front and rear pulse energy portions with a middle point of the radiation time period thereof providing a boundary between the front and rear energy portions, a quantity of energy/of said rear portion is greater than that of said front portion.

9. The optical recording device as recited in claim 8, wherein said recording medium is a recording medium which allows recording and erasing two or more times.

* * * * *